United States Patent [19]

Schron et al.

[11] Patent Number: 4,721,293

[45] Date of Patent: Jan. 26, 1988

[54] SELF-LOCKING CLAMPING DEVICE

[75] Inventors: Jack H. Schron, Chagrin Falls; Lawrence H. Seidel, Mentor, both of Ohio

[73] Assignee: Jergens, Inc., Cleveland, Ohio

[21] Appl. No.: 895,882

[22] Filed: Aug. 12, 1986

[51] Int. Cl.⁴ .................... B23Q 3/08

[52] U.S. Cl. .................... 269/32; 269/94; 269/234; 269/238

[58] Field of Search .................... 269/32, 232, 234, 229, 269/93, 138, 238

[56] References Cited

U.S. PATENT DOCUMENTS

| | | | |
|---|---|---|---|
| 2,722,867 | 11/1955 | Dackor et al. | 269/234 |
| 3,170,322 | 2/1965 | Cavanaugh | 269/234 |
| 3,336,022 | 8/1967 | Tridgell | 269/32 |
| 3,941,362 | 3/1976 | Arnold et al. | 269/32 |
| 3,998,444 | 12/1976 | Stockwell | 269/20 |
| 4,406,445 | 9/1983 | Seidel | 269/32 |
| 4,511,127 | 4/1985 | Schron et al. | 269/32 |

*Primary Examiner*—Robert C. Watson
*Attorney, Agent, or Firm*—Pearne, Gordon, McCoy & Granger

[57] ABSTRACT

A self-locking, fluid-operated, tool clamping device is disclosed. The device provides a double-acting piston formed with a camming surface intermediate its ends. The camming surface is formed with a locking angle with respect to the axis of the piston. A cylindrical clamping pin is guided within the device for movement in a direction perpendicular to the camming surface and is provided with an end surface perpendicular to such direction of movement which engages the camming surface. An output lever pivotably mounted on the device engages the clamping pin at one end and is operable to engage tooling at its other end to clamp the tooling in position. The clamping pin is cylindrical and is free to rotate about its axis so as to reduce localized wear when the device is repeatedly cycled. A spring operably positioned between the lever and the body of the device resiliently biases the lever and the clamping pin toward the release position.

11 Claims, 4 Drawing Figures

SELF-LOCKING CLAMPING DEVICE

BACKGROUND OF THE INVENTION

This invention relates generally to fluid pressure-operated clamping devices and more particularly to a novel and improved, hydraulically-operated, self-locking clamp for clamping tooling such as fixtures, dies or mold plates to position them on a bolster plate or other mounting means and the like.

PRIOR ART

Hydraulically-operated clamps for releasably locking tooling such as dies, fixtures or mold plates are known. Such devices permit the rapid change of tooling in production machines and, therefore, reduce the change-over time when such a tooling must be replaced. Examples of such devices are illustrated in U.S. Pat. Nos. 3,336,022, 4,406,445 and 4,511,127. The latter two of such patents are assigned to the assignee of this invention.

Generally in the past, such devices required pressure to be maintained so long as clamping was required. In the latter of such patents, U.S. Pat. No. 4,511,127, however, a self-locking, clamping device is disclosed which maintains the clamping operation even when pressure is not maintained and, fluid pressure is supplied when release of the clamping device is required.

In such device, a double acting piston is provided with a cam surface intermediate its ends and a clamping pin is reciprocable in a direction perpendicular to the direction of piston movement. When small locking cam angles are provided, in such device, the clamping pin must be maintained in a predetermined orientation so that the cam follower means or cam follower surface on the end of the clamping pin properly seats on the piston cam surface. Consequently, such patent discloses guide means to maintain such proper orientation of the clamping pin. Therefore, a relatively complex clamping pin and guide structure is required. As a result, the pin length must be relatively long and the cost of manufacture is increased.

SUMMARY OF THE INVENTION

In accordance with the present invention, a novel and improved self-locking clamping device is provided. Such device is structured for low cost, ease of manufacture, reliable operation and compact size. In the illustrated embodiment, a double acting piston is provided with a cam surface intermediate its ends. The cam surface is provided with a locking angle and engages one end of a simple cylindrical clamping pin. The piston is positioned in a cylinder bore and the two ends of the piston each cooperate with the associated end of the bore to provide a cylinder chamber. When one cylinder chamber is pressurized while the other is exhausted, the piston moves in one direction, and when the pressure connections are reversed, the piston moves in the opposite direction.

The clamping pin is positioned in a secondary passage and is guided for reciprocation along a line of action therein. Such secondary passage intersects the cylinder bore intermediate its end at an angle which guides the clamping pin for movement perpendicular to the cam surface on the piston. Consequently, the end of the clamping pin which engages the cam surface of the piston is not formed at cam angle, but rather, is perpendicular with respect to the line of action of the clamping pin.

With such structure, it is not necessary to maintain any particular rotational orientation of the clamping pin and the cam surface. Therefore, guides to maintain such particular orientation of the clamping pin with respect to its line of action are not required. In fact, the clamping pin is preferably allowed to rotate about its axis to provide more even wear by presenting different end surface portions for contact with the piston cam surface as the device is cycled through repeated operations.

Further, because the cam surface is formed with a locking angle, the device is self-locking and a clamping force is maintained even when pressure is not supplied to the unit. This provides an important safety feature since clamping is maintained even if pressure is lost for any reason. Further, the clamping device can be clamped up and the pressure lines can be removed while the clamping operation is maintained. This feature is particularly desirable when the unit is installed in equipment which must be moved from place to place in use. When the clamping device is to be released it is merely necessary to reconnect the pressure lines and release the clamp.

In the illustrated embodiment, a lever clamp is provided in which a lever is pivoted substantially at its center and is actuated at one end by the clamping pin. The other end of the lever provides the clamping function. In such device, a single spring functions to move both the lever and the clamping pin to the released position.

These and other aspects of the invention are illustrated in the accompanying drawings and are more fully described in the following specification.

DETAILED DESCRIPTION OF THE DRAWINGS

Figure 1:
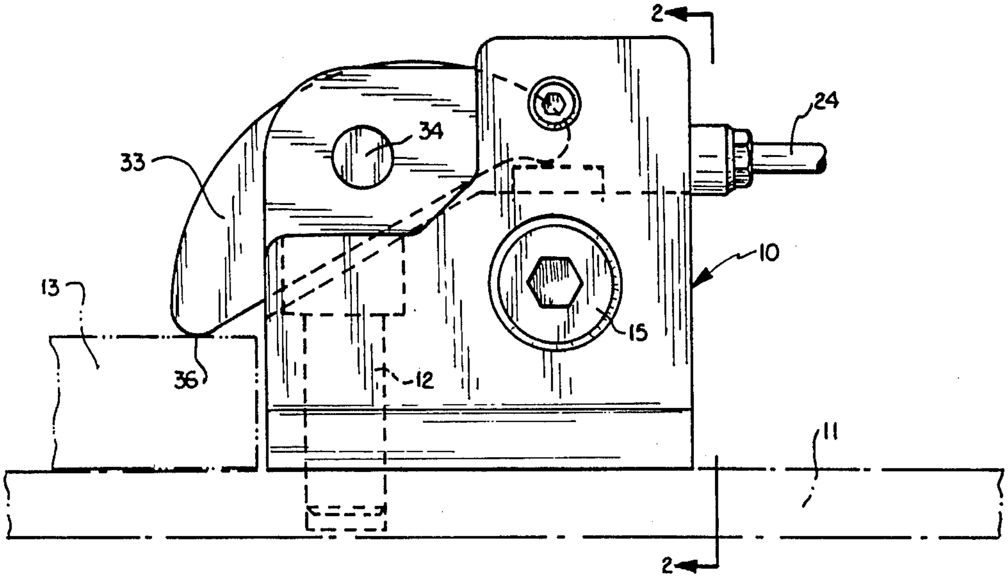
FIG. 1 is a side elevation illustrating a self-locking, fluid-operated, clamping device incorporating this invention.

The illustrated embodiment includes a body 10, mounted on a bolster plate 11 (schematically illustrated in the drawings) by hold-down bolts or T-bolts which cooperate with T-slots therein (not shown) formed in the bolster plate 11. The clamping device operates to releasably clamp schematically illustrated tooling 13 against the bolster plate 11. Often, several clamping devices are situated around the periphery of the tooling plate 13 and are connected for simultaneous operation.

Figure 2:
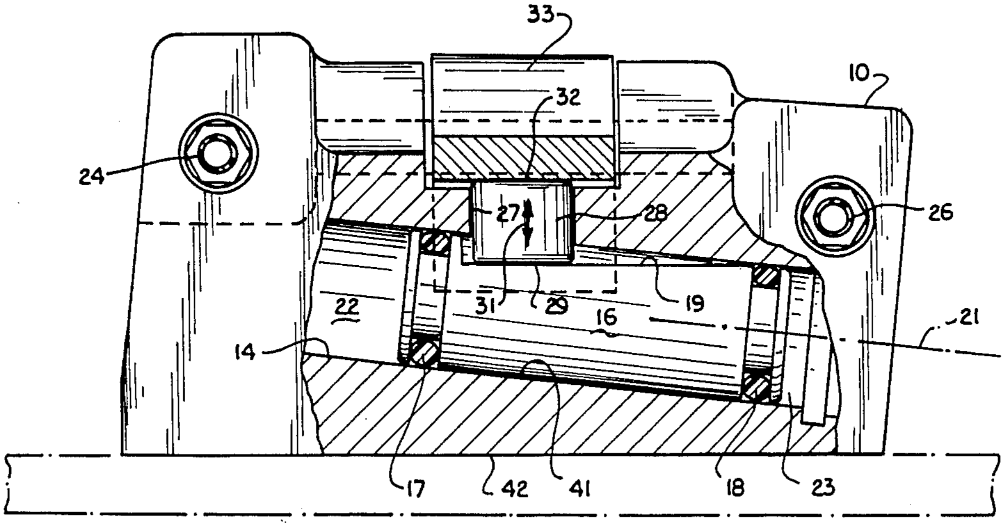
FIG. 2 is an elevation taken along 2—2 of FIG. 1 illustrating the device in partial section to show the internal structure.
Figure 3:
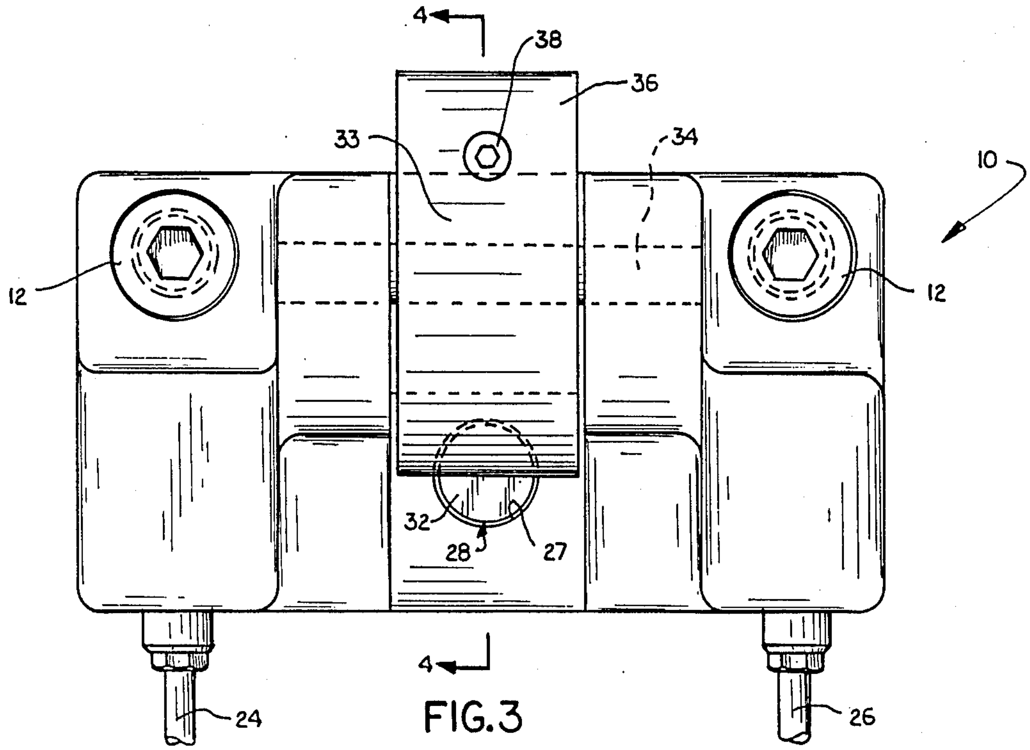
FIG. 3 is a plan view of the device.
Figure 4:
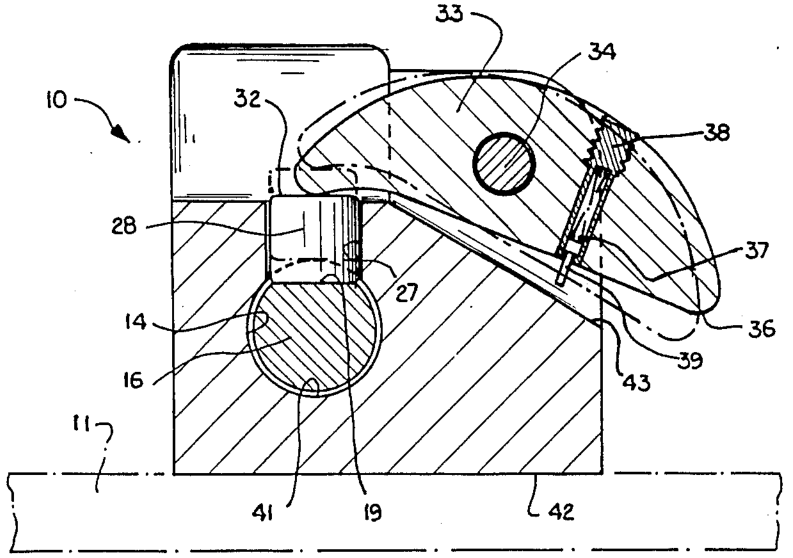
FIG. 4 is a cross section taken along 4—4 of FIG. 3.

A cylinder bore 14 extends across the rearward side of the body 10 and is closed at each end by an end cap 15 as illustrated in FIG. 1. The bore 14 is inclined as best illustrated in FIG. 2 and as discussed in greater detail below.

Positioned within the cylinder bore is a double acting piston 16 which is reciprocable along the cylinder bore axis or first lien of action. The piston 16 closely fits the bore and is provided with O-ring type seals 17 and 18 adjacent to its left and right ends, respectively, as viewed in FIG. 2. The two seals 17 and 18 are spaced apart by a substantial distance to provide a central piston portion having a camming surface 19 along one side thereof. Such camming surface is formed at a locking angle with respect to the axis 21 of the cylinder bore 14. Such locking angle is less than about 10 degrees and is preferably about 6 degrees.

The left end of the piston cooperates with the adjacent end of the cylinder bore 14 and associated end cap 15 to define a first pressure chamber 22. Similarly, the right end of the piston cooperates with the adjacent end of the cylinder bore and the adjacent end cap 15 to define a second pressure chamber 23.

A first pressure line 24 communicates through passages in the body (not illustrated) with the pressure chamber 22 and a second pressure line 26 similarly communicates with the pressure chamber 23. When pressure is supplied to the pressure chamber 22, while the pressure chamber 23 is exhausted, the piston moves to the right as viewed in FIG. 2, and when the pressure connections are reversed, the piston moves to the left. Such pressure lines are normally connected through a four-way valve (not illustrated) to a hydraulic pressure source and a reservoir return so that the pressure connection can be easily reversed to cause the clamping and unclamping operation of the device.

The body is also formed with a secondary bore or passage 27 which is open at its lower end to the cylinder bore at about the middle thereof. Positioned within the secondary bore 27 is a cylindrical clamping pin 28 having an inner end face 29 engaging the camming surface 19.

The secondary bore 27 guides the clamping pin for reciprocation back and forth along a second line of action indicated by the double end of the arrow 31. Such line of action 31 is perpendicular to the camming surface 19. Therefore, the end face 29 of the clamping pin is perpendicular to the length of the pin and is not inclined with respect thereto.

The upper end 32 of the clamping pin engages the rearward end of a clamping lever 33, which in turn is jounalled on a body 10 by a pivot pin 34. The forward end 36 of the clamping lever 33 extends beyond the body 10 and engages the tooling 13 and operates to clamp the tooling 13 against the bolster 11 when the clamping device is actuated.

A release spring 37 within a spring retainer 38 threaded into the clamping lever 33 resiliently biases a spring plunger 39 against an adjacent surface 43 on the body 10 to resiliently bias the lever 33 and, in turn, the clamping pin 28 toward their released position.

When it is desired to clamp the tooling 13 in position, fluid under pressure is supplied to the pressure chamber 23 through the pressure line 26 and the pressure line 24 is connected to the reservoir return to exhaust the pressure chamber 22. This causes the piston 16 to move to the left as viewed in FIG. 2 and moves the cam surface 19 to the left with respect to the clamping pin 28. This piston movement causes the clamping pin 28 to move in an upward direction and produces anti-clockwise movement of the lever 33, as viewed in FIG. 1, until the forward end of the clamping lever 33 is clamped against the tooling 13. When further anti-clockwise movement of the lever 33 is prevented by its engagement with the tooling, the reaction force transmitted through the clamping pin 28 causes the piston 16 to stall in the locked-up position. In such position, the reaction force is transmitted from the clamping pin 28 through the piston to the adjacent surface 41 of the cylinder bore 14.

Because the camming surface 19 is formed with a locking angle, the frictional forces between the piston 16 and the adjacent surface 41 of the cylinder wall combine with friction forces between the end surface 29 and the camming surface 19 to lock the piston in the clamped or locked-up position. Therefore, if pressure is released from the pressure chamber 23, the clamping device remains clamped and the tooling 13 remains securely clamped against the bolster plate 11. When it is desired to release the clamping device, the pressure chamber 22 is pressurized and sufficient force is developed urging the piston to the right as viewed in FIG. 2 to overcome the locking friction and release the clamping device. When such action occurs, the spring 37 returns the clamping lever and the clamping pin to the released position and the tooling can be removed and replaced.

Because the camming surface is formed at a small angle with respect to the axis 21, high-clamping forces can be achieved with relatively small diameter pistons even though locking friction is developed. Further, because the pistons can be relatively small in diameter for a given output clamping force,a very compact unit can be produced. Still further, because the clamping pin is merely a cylindrical solid member with parallel end faces perpendicular to the length of the clamping pin, the clamping pin can be easily produced and can be very short. In the illustrated embodiment, the diameter of the clamping pin exceeds its length. Therefore, a very compact unit can be produced which may be used in confined locations.

When the secondary bore 27 is formed as a cylindrical passage and the clamping pin 28 is formed as a cylindrical member, the clamping pin tends to rotate about its axis as the unit is repeatedly cycled. This results in engagement between the cam surface and various portions of the end face 29 and prevents localized wear from occurring at such end face. This extends the useful life of the device. It should be understood that in accordance with the broader aspects of this invention, a non-cylindrical pin can be positioned with a non-cylindrical secondary opening if rotation of the pin during operation is not desired. However, in such instances, the advantages of reduced localized wear and extended life resulting from rotation of the locking pin above its longitudinal axis are not provided.

The thickness of the body between its lower surface 42 and the reaction surface 41 must be sufficient to withstand the reaction forces produced during the operation of the device. However, the thickness of the body between the bore 14 and the lower surface 42 adjacent to the pressure chamber 23 can be substantially smaller since the reaction forces are not transmitted at such location. Consequently, the bore can be formed in the body so that the right end of the bore as viewed in FIG. 2 is close to the lower surface 42 of the body without encountering any functional weakness in the system.

It should be understood that although the illustrated embodiment combines an inclined cylinder bore with a clamping lever, in accordance with the broader aspects of this invention, a clamping system can be utilized with other forms of output structures.

Although the preferred embodiments of this invention has been shown and described, it should be understood that various modifications and rearrangements of the parts may be resorted to without departing from the scope of the invention as disclosed and claimed herein.

What is claimed is:

1. A compact pressure-operated clamping device comprising a body, double acting piston means reciprocable in said body along a first line of action in response to selectively applied fluid pressure, said piston means providing a camming surface inclined relative to said first line of action at a locking angle, and a clamping pin in said body providing follower means at one end engageable with said camming surface, said clamping pin being guided in said body for reciprocable movement along a second line of action perpendicular to said camming surface and being reciprocable along said second line of action in response to reciprocation of said camming means, said camming surface causing said piston means to frictionally lock in said body when clamping forces are applied and even when fluid under pressure is not supplied thereto, said body providing a cylindrical bore along which said piston means reciprocates, the side of said bore opposite said clamping pin engaging said piston means and providing a reaction surface supporting said piston means against forces applied thereto by said clamping pin, the engagement between said reaction surface and said piston means producing a frictional force providing a substantial amount of self-locking action of said piston means.

2. A clamping device as set forth in claim 1 wherein said clamping pin is free for at least limited rotation about said second line of action.

3. A clamping device as set forth in claim 1 wherein said follower means is a planar surface on said clamping pin perpendicular to said second line of action.

4. A clamping device as set forth in claim 3 wherein said clamping pin is cylindrical and is free to rotate about said second line of action.

5. A clamping device as set forth in claim 4 wherein said body provides a lateral passage which is cylindrical and is sized to closely fit said clamping pin.

6. A clamping device as set forth in claim 5 wherein said clamping pin has a diameter exceeding its length.

7. A clamping device as set forth in claim 5 wherein said piston means provides spaced piston ends, and said camming surface is located between said piston ends.

8. A clamping device as set forth in claim 7 wherein said locking angle is at least substantially as small as 10 degrees.

9. A compact pressure-operated clamping device comprising a body, a cylinder bore in said body, a secondary passage in said body intersecting said cylinder bore intermediate its ends, a double-acting piston in said cylinder bore providing piston means at each end and an inclined camming surface between said piston means, said piston means cooperating with the adjacent ends of said cylinder bore to define an associated pressure chamber, port means operable to selectively connect each pressure chamber with a source of fluid under pressure and to selectively exhaust fluid pressure from each chamber, selectively applied pressure in each chamber operating to move said piston back and forth along said cylinder bore, said cam surface being inclined with respect to the axis of said cylinder bore at a locking angle, said secondary passage providing wall surfaces extending perpendicular to said camming surface, and a clamping element guided by said walls of said secondary passage for movement perpendicular to said camming surface, said clamping element providing an end surface engaging said camming surface and extending perpendicular to the walls of said secondary passage, said cylinder bore providing a reaction surface opposite said clamping element engaging said piston and supporting said piston against forces applied thereto by said clamping element, said engagement between said reaction surface and said piston providing sufficient friction when said clamping device is operated to clamp to provide a substantial portion of the locking of said piston means, movement of said piston in one direction producing extension of said clamping element and locking of said clamping element in its extended position even when both of said pressure chambers are exhausted, movement of said piston in the opposite direction releasing said clamping element and permitting retraction thereof.

10. A clamping device as set forth in claim 9 wherein an output element engages the end of said clamping element opposite said end surface thereof engaging said clamping surface, said output element being moveable with respect to said body for clamping tooling in position in response to operation of said piston.

11. A clamping device as set forth in claim 10 wherein said output element is pivoted on said body, and spring means positioned between said body and output element biases said output element and clamping pin toward their released positions.

* * * * *